Dec. 27, 1955  R. T. WILLIAMS  2,728,589
FUEL OIL BURNER VALVE
Filed Aug. 28, 1953  2 Sheets-Sheet 1

ROBERT T. WILLIAMS  INVENTOR
BY George J. Silhavy  ATTORNEY

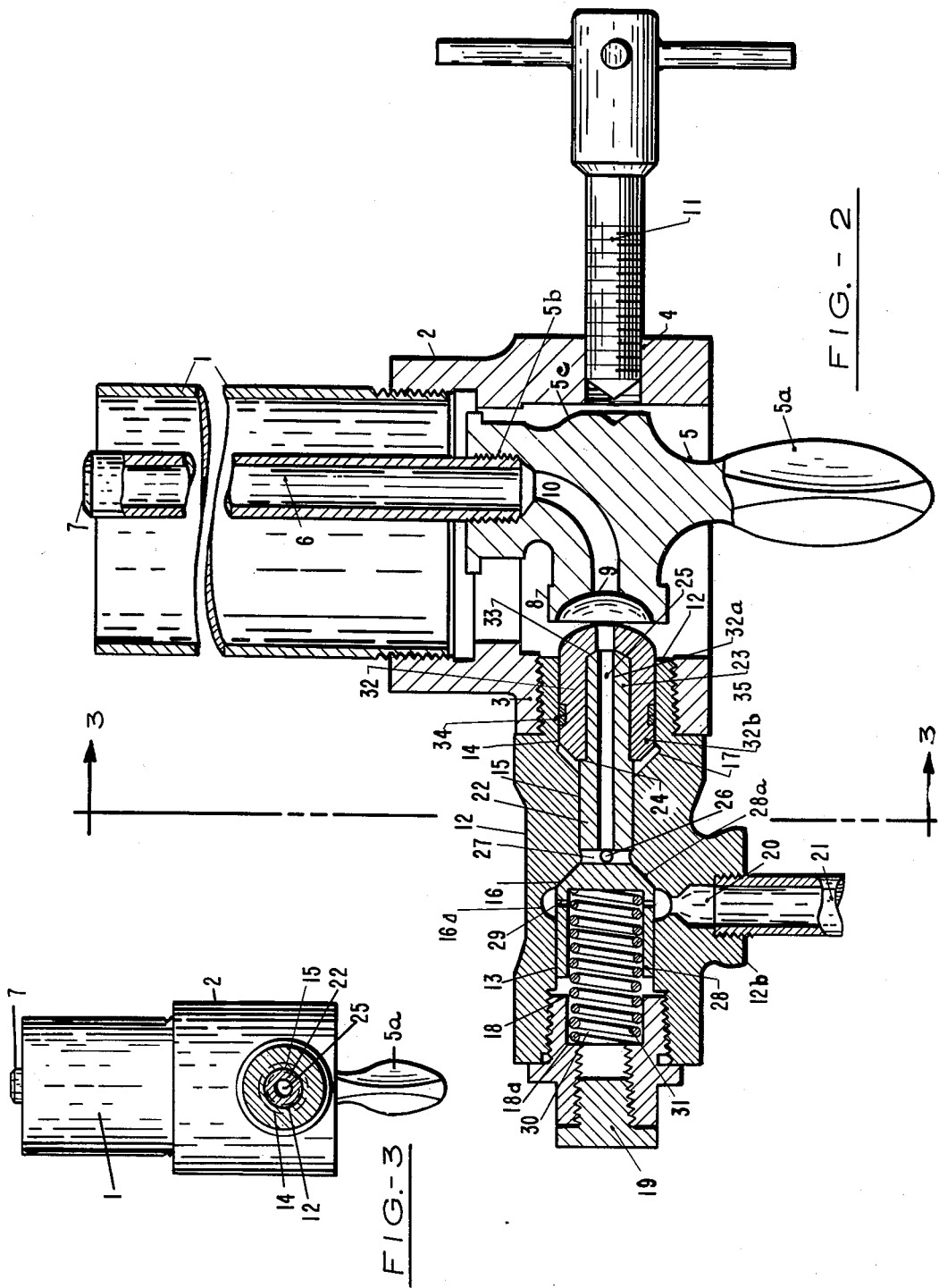

United States Patent Office 2,728,589
Patented Dec. 27, 1955

2,728,589

FUEL OIL BURNER VALVE

Robert T. Williams, Staten Island, N. Y., assignor to Butterworth System, Inc., a corporation of Delaware Application August 28, 1953, Serial No. 377,057

4 Claims. (Cl. 284—17)

The present invention relates to apparatus for separably joining two conduit sections. More particularly, the invention relates to a union to establish separable conduit connection and which includes a coupling element and a valve automatically operable by connection of said coupling between the two sections to establish flow through the sections, and to interrupt such flow by disconnection of the coupling element. A particular feature of the invention is a substantially leakproof automatic, double seated, shutoff valve structure which provides for a substantially fluid-tight connection with the coupling element and for positive opening of the valve by such connection, and which is automatically closed against fluid flow therethrough when such connection is broken.

It is a particular object of the invention to provide a conduit connection or union assembly for coupling a fuel supply line conduit with a fuel burner conduit tube whereby the connection may be accomplished or broken without dangerous loss of fuel at any stage of operation. It is a further object of the invention to provide a valve structure in which the moveable valve parts are positively actuated to open and close while retaining a substantially fluid-tight relationship to the coupling element and between structural elements of the valve.

The invention and its objects may be more clearly understood from the following description when it is read in conjunction with the accompanying drawings in which:

Fig. 2 is a similar view showing the valve in a closed position, and the coupling element disconnected; and Fig. 3 is a cross sectional view taken along the line III—III of Fig. 1.

Figure 1:
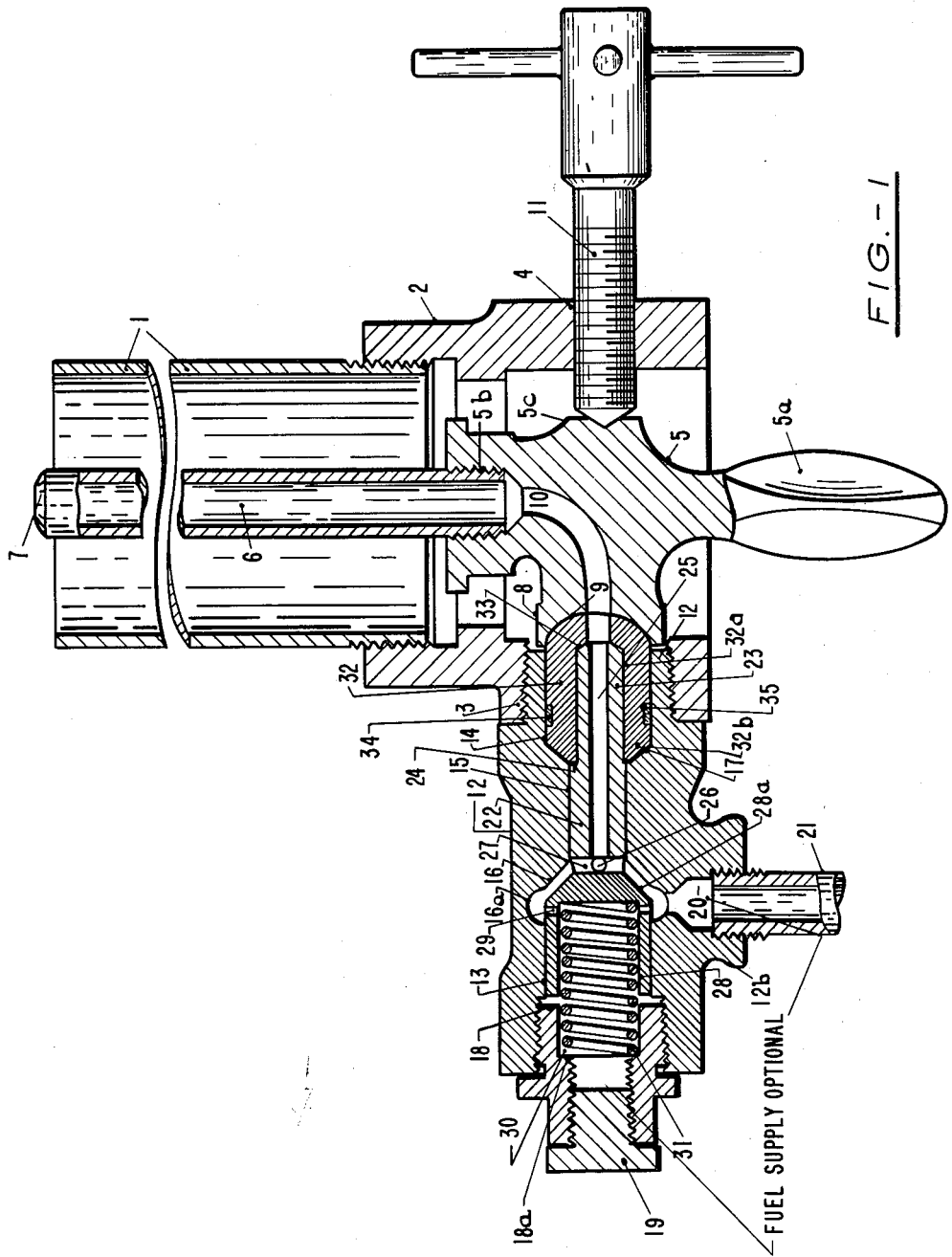
Fig. 1 is a longitudinal section through a conduit system for a fuel burner, including a coupling element and valve assembly, according to this invention, and in which the valve is shown in an open position.

Referring to the drawings in greater detail, the numeral 1 designates the shell or jacket of a fuel oil burner having an inner end and an outer end adapted to be received by a cylindrical housing support element 2. The housing element 2 is provided with a first internally threaded orifice 3 opening through a side wall, and a second internally threaded orifice 4 diametrically opposite to and coaxial with the passageway 3.

Disposed within the housing element is a coupling element 5, having a handle portion 5a at one end, and threaded recess 5b at the other end, adapted to receive and thereby support a burner conduit or discharge tube section 6 extended through the jacket 1. A conventional burner tip 7 is carried at the other end of tube 6 as shown. An enlarged boss 8 extends radially outward from the side of the element 5, and at its outer end is provided with an outwardly facing recess 9, having a generally spheroidal contour. A conduit passageway or duct 10 opens at one end from the bottom of the recess 5b inwardly and then radially outward through the coupling element 5 and boss 8, to open into the recess 9, concentrically therewith. Diametrically opposite to the boss 8, a second smaller boss 10 provides a seat for a jack or clamping screw 11 threaded through the orifice 4. When disposed within the housing element as shown, the bosses 8 and 10, and the screw 11 are aligned coaxially with the orifice 3, with the recess 9 facing the passageway.

A valve body 12 is provided for connection with the housing element 2 by means of the exteriorly threaded, nipple portion 12a, which is threaded into the orifice 3. Interiorly of the valve body is a concentric bore opening through each end thereof, and including an enlarged outer or inlet end portion 13, an enlarged inner or outlet end portion 14, and an intermediate bore portion 15 of substantially reduced cross section. Each of the portions 13 and 14 are chamfered inwardly at the junction thereof with the intermediate bore portion 15 to provide substantially annular, oppositely facing, frusto conical valve seats 16 and 17 respectively. An annular recess or grooved portion 16a is provided in the wall of bore portion 13 immediately adjacent the seat 16. The outer end of the bore portion 13 is also threaded to receive a substantially annular bushing 18, internally threaded at its outer end to receive a plug closure element 19. The bushing 18 is also provided with an internal, inwardly extended shouldered portion 18a. A threaded inlet passageway 20 opens through a radial boss 12b on the body 12 into the bore portion 13 adjacent the seat 16. In the apparatus as shown, the passageway 20 connects with a supply conduit 21. Alternately, the conduit 21 may be connected into the outer end of the bushing 18, and the plug 19 threaded into the passageways 20.

Internally of the valve body, and disposed in the bore concentric therewith, is a piston type valve mechanism, including a hollow valve stem which has an outer portion 22 adapted for insertion in the restricted bore portion 15, in fitted, reciprocally slideable relation thereto, and having a length slightly greater than said bore portion, and an inner portion 23 of reduced cross section and of a length slightly greater than the bore portion 14. Between them the portions 22 and 23 form an annular shoulder 24. In the arrangement shown, the bore of the hollow valve stem is designated by the numeral 25 and it opens from the innermost end of the portion 23 to the outer end of the portion 22, terminating there in at least one radial passageway or port 26 opening outwardly into a groove or recess 27 annularly of the exterior surface of the portion 21.

On the outer end of the portion 22 is a hollow piston head 28 fitted to the bore 13 in reciprocally slideable relation. The head 28 is thickened and chamfered at its junction with the stem portion 22 to provide a frusto conical seating surface 28a matching and engageable with the seating surface 16 of bore portion 13. A plurality of ports 29 open through the head 28 into the chamber 30 provided by the hollow head and the annular bushing 18. These ports are disposed so as to communicate with the recess 16a at all times. A helical expansion spring member 31 is disposed within the chamber 29, and is seated at one end on the inner surface of the head and against the shoulder 18a. Preferably the spring 31 is held under slight compression between the head 28 and shoulder 18a.

The inner portion 23 of the valve stem is also provided with a piston head element 32 which is fitted in slideable, reciprocal relation thereto into the bore portion 14 of valve body 12. This element has a concentric bore 32a extending therethrough, of which the major portion is of a length substantially equal to the length of the valve stem inner end portion 23 and adapted to receive the portion 23 in slideable telescopic relation. The bore is inwardly reduced to provide an annular shoulder 33 to receive the end of the valve stem portion 23. The bore opens through the head concentrically therewith. The outer end of the head 32 is provided with a spheroidal surface contour to mate with the recess 9 in boss 8, while the inner end of the head 32 is chamfered as at 32b to provide an annular, frusto conical seating surface to match and be received by the shouldered surface portion 17 at the junction of the valve body bore portions 14 and 15, and also so as to provide an annular end portion engageable against the valve stem shoulder 24. Intermediate the ends of the head element 32, in the outer surface thereof, there is an outwardly opening annular recess 34 adapted to receive a piston ring or packing element 35. Preferably, this is a metallic expansion ring element of generally conventional form.

The valve, as illustrated, is assembled, by first inserting the valve stem and the attached head portion 28 through the outer end of the body 12, with the head 28 within the bore portion 13, and the stem portions 22 and 23 extending into the bore portions 15 and 14, respectively. The spring is then inserted into the hollow head, and the bushing 18 applied and threaded into the valve body, compressing the spring slightly and forcing the surface 28a of head 28 into seating engagement with the seat 16 as shown in Fig. 2. Plug 19 is then threaded into the bushing as shown. The head element 32 is then applied over the inner end portion 23 of the valve stem by insertion into the valve body bore portion 14. A suitable packing or piston ring is inserted in the recess 34, before insertion of the head into bore portion 14. The valve body may then be threaded into the housing element passageway 3, and the fuel supply conduit 21 connected in the inlet 20 as shown.

With the valve and housing elements connected, the final operating connection to the burner nozzle may be accomplished. This is done by inserting the nozzle 7 and burner discharge tube 6 through the housing 1 in connection with the coupling 5, and by means of the handle 5a. With the tube 6 fully inserted, the coupling 5 will then be within the housing element 2, where it is positioned so that the recess 9 is opposed to the mating head 32 which protrudes from the valve body as shown in Figs. 1 and 2. The jack screw 11 is then threaded through the passage 4 provided in the element 2 to engage the boss 10, and thereby to force the coupling recess 9 into seating engagement with the correspondingly contoured surface of the piston head 32. Under pressure applied by the jack screw, through the coupling, the head is firmly seated by means of the shoulder portions 24 and 33, and both the head and valve stem forced outwardly until the head surface 32b is seated in fluid tight relation against the seating surface 17. In seating the head surface 32b against the surface 17 of the bore portion 14, outward movement of the valve stem unseats the head portion 28a from the valve seat 16, and establishes communication between the annular recess 16a and the annular recess 27. In this condition, the valve is open, and from the conduit 21 a flow path is established through inlet 20, recess 16a, between and over the surfaces 28a and 16, through recess 27 and ports 26 into the bore 25 through the valve stem, and thence by way of the coupling conduit passageway and tube 6 to the discharge outlet of nozzle 7.

When thus completely coupled, the assembly provides a series of fluid tight seals which are substantially maintained by the pressure of the jack screw 11. Leakage at the joint between the piston head 32 and the coupling 5 is prevented by the fitted pressure connection between the matching contoured surfaces. Possible leakage along the valve stem portion 22 is prevented at the pressure seated surfaces 17 and 32b, which in an emergency, and during the seating stroke, is supplemented by the overlapped packing or piston rings 35.

When the pressure of the jack screw is relieved, as when the nozzle 7, tube 6, and coupling 5 are to be withdrawn from the housing, the seal between the contoured surfaces of the head 32 and the recess 9 is maintained by the spring member 31 in chamber 30, supplemented by the service pressure of a fluid in conduit 21 admitted to the chamber by way of ports 29. This pressure also aids to move the head 28 and the valve stem inwardly to engage the surfaces 28a and 16 in a fluid tight relationship. During the interim period between the time the valve is fully open and fully closed, and when neither the surfaces 28a and 16, nor the surfaces 17 and 32b are in a sealing relationship, possible leakage along the valve stem and inner head surfaces is substantially prevented by the packing or piston rings 35. When the valve is closed, the jack screw may be completely disengaged from the coupling, and the coupling tube and nozzle members may be withdrawn by means of the coupling handle.

What is claimed is:

1. In a conduit system, including an upstream conduit section, a downstream conduit section; a union for joining said sections in which said union comprises the combination of a first coupling unit having an internal duct adapted to be connected at one end to said downstream conduit section, and at the other end opening through a contoured surface portion integral with said coupling forming one portion of a ball and socket joint, a second coupling unit comprising an elongated valve body; a bore longitudinally of said body, said bore consisting of an inlet end portion and an outlet end portion each opening outwardly from said body, and a portion of reduced cross section intermediate and joining said end portions; a closure for said inlet end portion remote from the portion of reduced cross-section forming therein a valve chamber; an annular seat in each bore end portion at the juncture of each end portion with said intermediate bore portion; a valve in said bore having a head within said inlet bore portion and valve chamber, and a stem having an outer end joined to said head and extending therefrom through said intermediate bore portion in reciprocally slideable surface contact with the wall of said intermediate bore portion to terminate in a radially inwardly extending annular shoulder in longitudinally spaced relation outwardly beyond the juncture of said intermediate and outlet end bore portions and an inner end on said valve stem of reduced diameter relative to said valve stem outer end, extending from said shoulder through said bore outlet end portion to a terminal end in longitudinally spaced relation outwardly beyond said body and bore outlet end portion; an annular recess in said stem at the juncture thereof with said head; a duct internally of said stem extending from said head juncture to open through the opposite inner end of the stem; at least one port opening from the bottom of said recess into said duct; an expansion spring disposed within said valve chamber and slightly compressed between said closure and said valve head, said spring adapted to urge said valve head into seating relationship to the valve seat in said chamber; an inlet port to said chamber adapted to receive said upstream conduit section into communication with said valve chamber; an annular cap for the inner end of said valve stem fitted thereon in telescopic reciprocally slideable relation to engage the terminal end of said stem inner end interiorly of said cap at the outer end thereof and at the other end to engage said annular shoulder, said cap having an annular surface portion at the inner end thereof adapted for engagement with said seat at the junction of said intermediate bore portion and said bore outlet end portion, said cap also having a contoured outer end surface portion adapted to mate with the contoured surface portion of said coupling element in fluid tight relation thereto, and forming the other portion of said ball and socket joint; a port in the outer end of said cap opening therethrough to register with said valve stem and coupling internal ducts; and means for urging said coupling and cap contoured surface portions into mating, fluid-tight relation, while seating said cap upon said valve seat in said outlet bore portion and unseating said valve head in said inlet bore portion by displacement of said stem longitudinally of said bore against the resistance of said expansion spring.

2. An apparatus according to claim 1, in which said annular cap is provided with an annular recess in the outer wall surface thereof, said recess disposed intermediate the ends of said cap so as to lie entirely within said bore outer end portion during operation of said valve and at least one split expansion ring member fitted in said recess and adapted to engage the wall surface of said outlet end bore portion.

3. An apparatus according to claim 1, in which the contoured outer end surface portion of said annular cap has a convex substantially spherical conformation and the contoured surface portion of said first coupling unit element has a concave substantially spherical conformation, said respective portions forming mating parts of a ball and socket joint.

4. An apparatus according to claim 1, in which the wall of said valve chamber includes an annular recess portion disposed in immediately adjacent relationship to said annular seat in said chamber, said inlet port opening into said chamber through the bottom wall of said recess portion, and wherein said valve head is a substantially hollow cylindrical cup-shaped member having a substantially solid end portion joined to said valve stem, disposed in fitted telescopic, slideable surface contact with the inner wall of said valve chamber, said member being adapted to receive one end of said expansion spring, a plurality of ports in the side wall in said cylindrical member disposed therein to provide continuous communication between said annular valve chamber recess and the interior of said cup-shaped cylindrical member.

References Cited in the file of this patent

UNITED STATES PATENTS

| | | |
|---|---|---|
| 1,073,719 | Timmer | Sept. 23, 1913 |
| 1,207,739 | Frazier et al. | Dec. 12, 1916 |
| 2,453,741 | Bopp | Nov. 16, 1948 |